DOUBLE FREQUENCY DETECTION SYSTEM

Filed Jan. 22, 1965 2 Sheets-Sheet 1

INVENTORS.
JAMES D. CAROTHERS
MARTIN O. HALFHILL

BY Robert B. Crouch
ATTORNEY

United States Patent Office 3,390,284

Patented June 25, 1968

3,390,284

DOUBLE FREQUENCY DETECTION SYSTEM

James D. Carothers, Saratoga, and Martin O. Halfhill, San Jose, Calif., assignors to International Business Machines Corporation, New York, N.Y., a corporation of New York Filed Jan. 22, 1965, Ser. No. 427,343
12 Claims. (Cl. 307—269)

ABSTRACT OF THE DISCLOSURE

A self synchronizing clock and data detector which accommodates maximum bit shift in binary signals magnetically recorded with double frequency techniques. A data detector circuit with a variable time constant is connected to a data read line and the time constant thereof adjusted in a predetermined manner under control of the data output signal to accurately differentiate between data signals and clock signals.

The present invention relates to magnetic recording and more particularly to improved means for detecting binary signals recorded with a double frequency technique.

In saturation-type magnetic recording, binary signals are usually recorded by a reversal of the magnetic flux, i e., by affecting a step-like change in magnetization from one remnant state of saturation of the recording medium to the opposite state. The flux reversals, or bits, are recorded in a timed sequence in synchronism with a series of regularly occurring clock signals. The frequency of the clock signals controls the rate at which the signals are recorded onto or read from the recording medium and also defines the clock interval, that is, the time period between adjacent clock signals. Double frequency recording is a saturation-type recording technique which is self-clocking, i.e., there is at least one flux reversal or bit recorded per clock interval. The double frequency recording technique can be explained as one in which a clock bit occurs during every clock interval and an additional data bit is either present or absent, depending upon the binary value of the data recorded during that clock interval. This technique can also be defined as one in which data of a first binary value is indicated by a single bit during a clock interval and data of the second binary value is indicated by two bits within a clock interval. To facilitate the readout process, it is desirable to achieve the maximum separation (one-half the clock interval) between bits. This, in practice, results in a clock bit at the beginning of every clock interval and a data bit at the midpoint of each clock interval having a second binary value.

The readout process of double frequency recorded signals requires identification of the various signals as either clock or data, then separation of the data signals from the block signals, and finally synchronization of one with the other. This process is complicated by the problem of bit shift, i.e., the tendency of either the clock or the data bits to be shifted from their assigned locations toward or away from an adjacent bit. Since both the amount and the direction of this shift are irregular and variable, the task of distinguishing the data signals from the clock signals becomes exacting. Previous attempts at detection and separation of double frequency recorded signals have either completely ignored the problem of bit shift or have made provision to accommodate only the average amount of bit shift. Both these approaches create the possibility that certain bits may go undetected and that clock bits may be mistaken for data bits and vice versa.

The object of the present invention is to provide an improved means for detecting double frequency recorded signals which is capable of automatically accommodating the maximum amount of bit shift.

The above object is realized in the present invention by the provision of circuitry for detecting and separating the clock and data bits in double frequency recorded signals. This circuitry includes two detector circuits, the first for detecting the clock bit in each clock interval and the second for detecting clock intervals having a given binary value, which may represent the absence or presence of data and feedback means for increasing or decreasing the time constant of the second detector circuit in a predetermined pattern under control of the output signals from the second detector circuit. By varying the time constant of the second detector circuit, the present invention accommodates the maximum bit shift and ensures that all recorded bits will be detected and properly identified. The outputs of the two detector circuits are applied along separate lines, i.e., a data line and a clock line, and provision is made for synchronizing these outputs with each other.

Other objects and many of the attendant advantages of this invention will be readily appreciated as the same becomes better understood by reference to the following detailed description of preferred embodiments of the invention as illustrated in the accompanying drawings, wherein.

Figure 1:
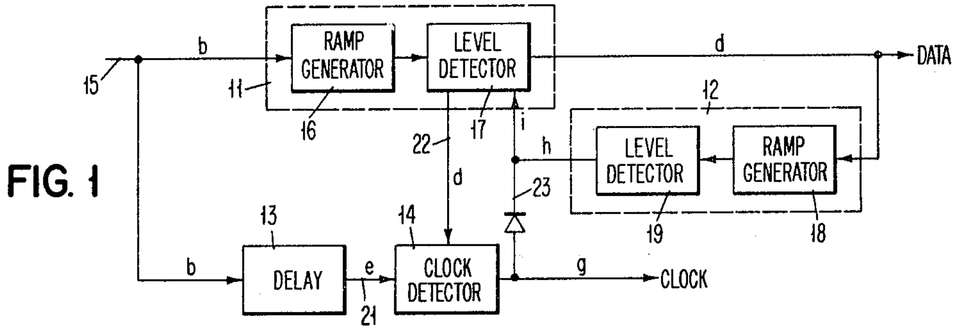
FIG. 1 is a schematic diagram of the logical circuitry employed in a preferred embodient of the present invention.

The detection circuitry illustrated in FIG. 1 is an improvement over the double frequency detection system of application Ser. No. 419,797, filed on Dec. 21, 1964. This circuitry is intended to be connected to the output of a magnetic read circuit to receive raw read signals from the magnetic medium. The circuit includes a data detection circuit 11, a feedback timing circuit 12, a delay mechanism 13 and a clock detector circuit 14. Raw read signals are supplied along a line 15 to an input of the data detector 11 and of the delay mechanism. The detection circuit 11 includes a ramp generator 16 and a level detector 17, the ramp generator being reset by each signal occurring on the input line 15. The feedback timing circuit is similar to circuit 11 and includes a ramp generator 18 and a level detector 19, the ramp generator 18 being reset by each signal on the data line from detection circuit 11. The delay mechanism may be any suitable means, such as a capacitor, monostable multivibrator, etc., that will pass each of the signals on the input line 15 with a uniform delay. The clock detector 14 is a monostable multivibrator of the type that is set by the first signal occurring on line 21 from the delay mechanism and which will then ignore any further signals on line 21 until it has timed out. The clock detector however can be reset before it has timed out by a signal on line 22 from the data detector 11. The outputs of the clock detector 14 and the feedback timing circuit 12 are connected by line 23 to level detector 17.

Figure 2:
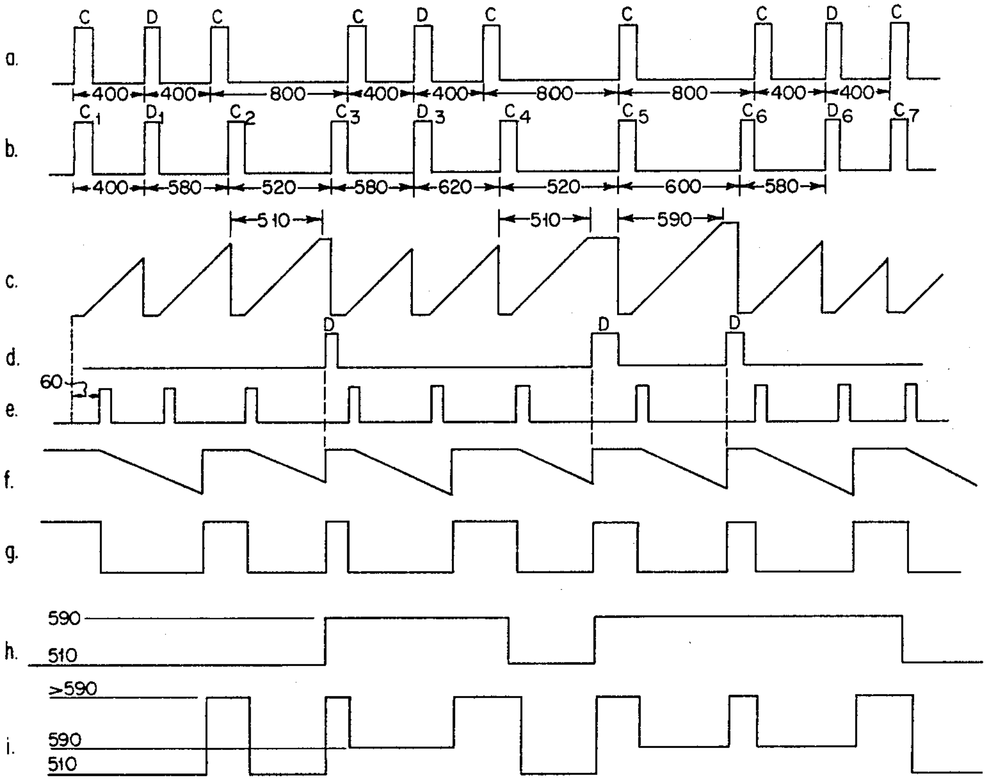
FIG. 2 shows a series of waveforms illustrating the relationship of signals in the different portions of the circuit of FIG. 1.

Referring to the waveforms of FIG. 2, waveform *a* illustrates the ideal double frequency read signals. In this waveform the clock bits C occur at a uniform frequency of 800 nanoseconds. The data bits D occur at the midpoints of the appropriate clock intervals, i.e., 400 nanoseconds after the first clock bit and 400 nanoseconds before the following clock bit. Typical raw read signals are illustrated in waveform *b*. As shown, the clock bits do not occur at a uniform frequency of 800 nanoseconds and the data bits may occur more than 400 nanoseconds before and after the clock bits. A clock bit which follows a data bit, but which is not in turn followed by a data bit, may be shifted toward the following clock bit due to pulse crowding effects, etc. Likewise, a clock bit which follows a clock bit and is followed by a data bit may be shifted toward the preceding clock bit. In addition, a data bit which is adjacent a shifted clock bit may be shifted in the same direction as the clock bit, but to a lesser degree, by a variety of effects, including distortion in reading, cumulative inaccuracies in the read/write circuit components, transducer tolerances, etc. These conditions are representative of bit shift and are depicted in the various clock intervals of waveform *b*. For the sake of the present explanation, it is assumed that the numbers shown on waveform *b* represent the maximum amount of bit shift, i.e., the maximum spacing between a data bit and either the preceding or the following clock bit will not exceed 620 nanoseconds, while the minimum spacing between two adjacent clock bits will never be less than 520 nanoseconds. In this example, the data detector is provided with a variable time constant or decay period, the highest value of which exceeds the clock interval; the intermediate value (590 nanoseconds) is greater than either the maximum period between clock and data bits or the minimum period between adjacent clock bits; and the lower value of which (510 nanoseconds) is higher than the normal period between clock and data bits and lower than the minimum period between adjacent clock bits. The time constant of level detector 17 is adjusted by the feedback timing circuit to accommodate bit shift occurring between adjacent clock bits and between adjacent clock and data bits. The time constant is further adjusted by the clock detector 14 to accommodate bit shift occurring between adjacent data and clock bits. As shown in waveform *h*, the time constant of level detector 17 is normally at its lower value of 510 nanoseconds and is raised to its intermediate value of 590 nanoseconds by an output signal from the feedback timing circuit 12. As indicated in FIG. 1, waveform *b* of FIG. 2 is applied to the ramp generator 16 which is set by the leading edge of each pulse of the waveform. This characteristic of the data detector is illustrated in waveform *c*. Since the time period between clock bit $C_1$ and data bit $D_1$ is only 400 nanoseconds, ramp generator 16 will be reset by $D_1$ before there is any output from level detector 17. The time period between data bit $D_1$ and clock bit $C_2$ exceeds the lower time constant of level detector 17; however, the level detector is prevented by the clock detector from providing any output in this situation in a manner which will be explained. Since the minimum time period between adjacent clock pulses $C_2$ and $C_3$ when there is no data pulse, is 520 nanoseconds, the level detector 17 will provide an output signal before it is reset by clock pulse $C_3$. This sequence is illustrated in waveforms *c* and *d*. As shown in waveform *d*, a data pulse is provided by level detector 17 for every clock interval in which a data bit does not appear. The time constant of level detector 17 is kept at its normal lower value during this period to ensure that clock bit $C_3$ is not detected as a data bit. The time period between clock bit $C_3$ and data bit $D_3$ may exceed the lower time constant of 510 nanoseconds because the time constant of level detector 17 has been raised to its intermediate level of 590 nanoseconds to ensure that ramp generator 16 will be reset by data bit $D_3$ before there is any output from level detector 17. This is accomplished by the feedback timing circuit 12 in the following manner. The feedback timing circuit samples the data line so that ramp generator 18 is set by each data pulse of waveform *d*. This causes a signal on line 23 which raises the time constant of level detector 17 to its intermediate level of 590 nanoseconds, as shown on waveform *h*. This time constant of the ramp generator 18 is approximately one clock interval. When the ramp decays to this point, level detector 19 drops the signal on line 23 and readjusts the time constant of level detector 17 to its normal 510 nanoseconds. The function of the feedback timing circuit is to set the time constant of level detector 17 to its intermediate value after detecting a clock interval which does not contain a data bit. This is accomplished by setting the time constant of level detector 17 to its lower value and then having the feedback timing circuit raise the time constant to the intermediate value on the occurrence of each data signal on the data line. The time constant is maintained at this level until the data detector circuit determines whether another data bit occurs in the next clock interval, and if it does not, the feedback timing circuit readjusts the time constant to the lower value. This is demonstrated in waveform *h* between clock bits $C_3$ and $C_4$ and between clock bits $C_5$ and $C_7$.

The raw read signals of waveform *b* are also applied to delay mechanism 13 which delays each pulse an amount equal to the tolerance of the clock detector or 60 nanoseconds, as shown in waveform *e*. Waveform *e* is then applied along line 21 to the clock detector 14. The clock detector is provided with a decay period of 650 nanoseconds which is greater than the maximum period between clock and data bits and less than the normal clock interval (800 nanoseconds). The clock detector is set by the leading edge of each clock pulse in waveform *e*. After it is set, the clock detector times out and ignores the data pulses of waveform *e*, since the decay period of the clock detector exceeds the maximum period (580 nanoseconds) between the clock and data pulses of waveform *e*. This characteristic of the clock detector is illustrated in waveform *f*. In order to synchronize the detected clock signals with the detected data signals, the data signals of waveform *d*, are used to reset the clock detector before the end of the clock detector decay period. This is shown in waveform *f*. Accordingly, as shown in waveform *g*, the clock detector provides a clock signals whenever it is fired, that is, either 650 nanoseconds after each delayed clock pulse of waveform *e* or upon the occurrence of a data pulse on line 22 from the data detector. The clock detector is thus resynchronized with every data signal to provide a fixed relationship between the data signals and the clock signals. As mentioned above, the clock detector is used to adjust the time constant of level detector 17 to accommodate the bit shift occurring between a data bit and the adjacent clock bit, such as $D_1$ and $C_2$. This is accomplished by applying the detected clock signals along line 23 to raise the time constant of level detector 17 to its highest value on the occurrence of each clock pulse of waveform *g*. This value may be any arbitrary level substantially above 590 nanoseconds. Thus, the circuit is insensitive to bit shift betwen adjacent data and clock bits. As shown in waveform *i*, the time constant of level detector 17 is maintained at its highest level over the full width of each clock pulse of waveform *g*, i.e., until the next delayed pulse of waveform *e*. The level of the time constant is then returned to the setting determined by the feedback timing circuit.

Figure 3:
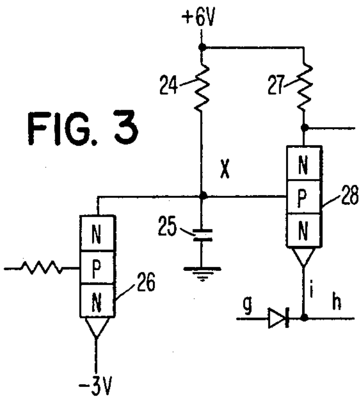
FIG. 3 is a circuit diagram of a circuit suitable for use as the data detector and feedback circuit in the embodiment of FIG. 1.

The circuit of FIG. 3 includes a switch, a ramp generator and a voltage level detector. The ramp generator consists of a 3K resistor 24 and a 120 mmf. capacitor 25 in series between +6 volts and ground. The level detector includes a 1.2K resistor 27 and a transistor 28 connected in series between +6 volts and the control voltage established on line 23. The base of transistor 28 is connected to the ramp generator at point X. A transistor switch 26 is connected between the capacitor and −3 volts, so that each pulse of waveform *b* at the base of the switch causes it to conduct, driving point X to −3 volts. When the switch is cut off by the trailing edge of the pulse, the capacitor starts to charge through the 3K resistor towards +6 volts, thus generating a ramp as shown in waveform *c*. When point X is at −3 volts, the transistor voltage detector is cut off. As the capacitor charges, the voltage detector will conduct at a base voltage of slightly above the control voltage. Because of the low base resistance (3K), the transistor voltage detector becomes fully conductive almost immediately, thereby producing a square output, waveform *d*, from the collector. As the voltage on line 23 changes in response to the signals from either the clock detector or the feedback timing circuit, the detection level of the voltage level detector changes; thus, changing the time constant of the data detector circuit.

Figure 4:
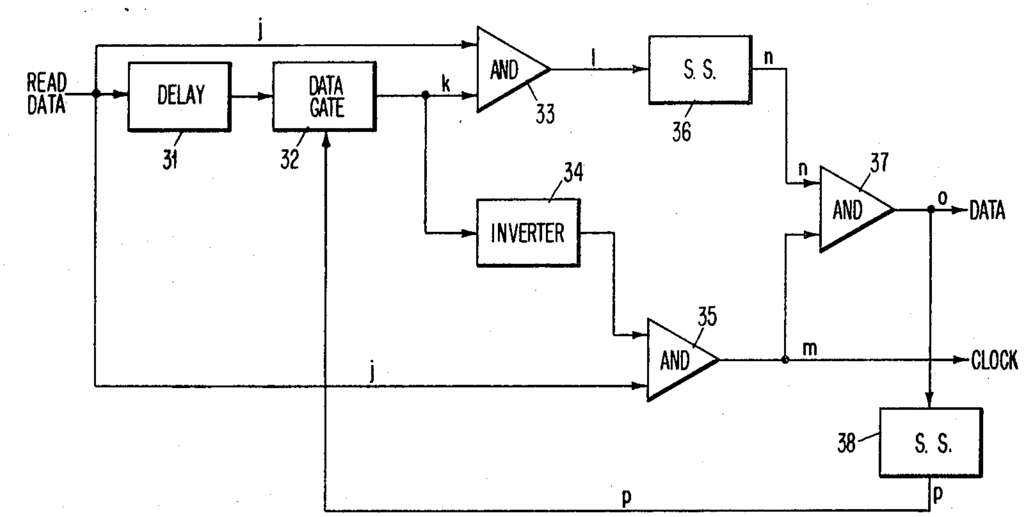
FIG. 4 is a schematic diagram of logical circuitry of an alternative embodiment of the present invention.

The embodiment of FIG. 4 illustrates the present invention as applied to circuitry for detecting the presence of data bits, rather than the absence of data bits as with the circuitry of FIG. 1. In this embodiment the data detector circuit includes a delay mechanism 31, a data gate 32 and an AND gate 33, while the clock detector circuit includes the delay mechanism 31, data gate 32, an inverter 34 and an AND gate 35. The delay mechanism may be any suitable device, such as a differentiator stage at the input of the data gate, which will in effect delay an input pulse an amount equal to the width of that pulse. The data gate may be a monostable multivibrator, for example, with provision for changing the time constant, such as by changing the voltage on the timing resistor, or by changing the effective value of the timing resistance by gating in a resistor in parallel with the timing resistor. Raw read signals are applied to the delay mechanism 31 and to AND gates 33 and 35. The output of the data gate is applied directly to AND gate 33 to separate the data bits, and through inverter 34 to AND gate 35 to separate the clock bits. The detected data bits are synchronized with the clock bits by means of a conventional monostable multivibrator or single shot 36 and an AND gate 37. The data bits are applied to single shot 36, the output of which is applied, along with the clock bits, to the AND gate 37. A feedback timing circuit consists of another conventional monostable multivibrator or single shot 38. The synchronized data from AND gate 37 is applied to single shot 38 and the output of the single shot is fed back to adjust the time constant of the data gate 32.

Figure 5:
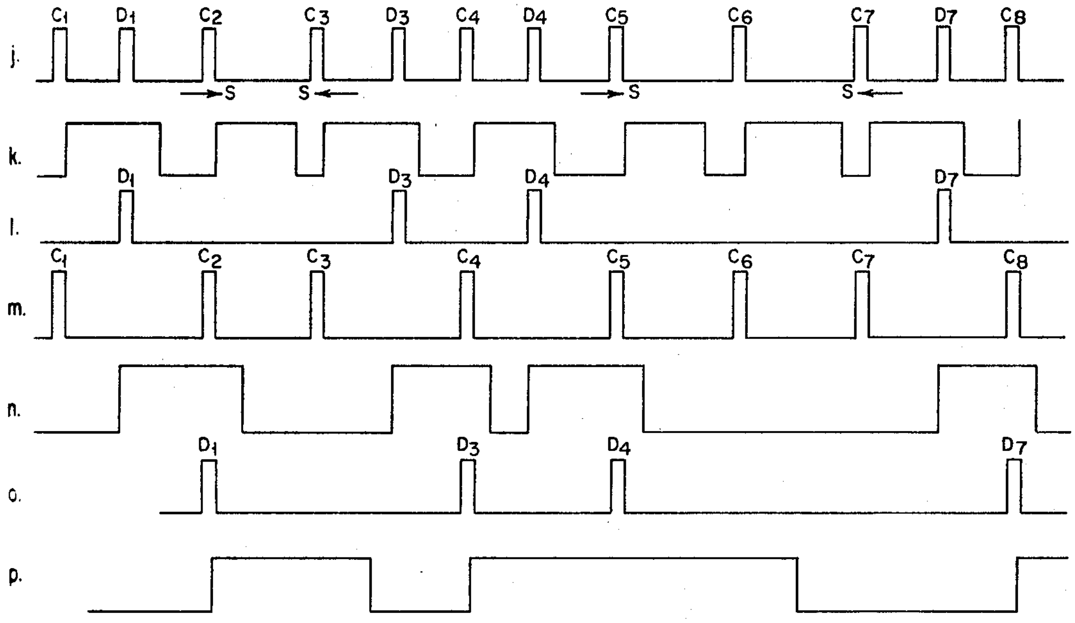
FIG. 5 is a series of waveforms illustrating the relationship of signals in different portions of the circuit of FIG. 4.

Referring to the waveforms of FIG. 5, waveform *j* illustrates typical raw read signals such as are applied through delay mechanism 31 to the data gate. The data gate produces a gating signal, waveform *k*, in which the signal level is raised by the trailing edge of each clock bit and is dropped again when the data gate times out. Waveform *k* is then used to gate the data bits of waveform *j* through AND gate 33. The separated data bits are shown in waveform *l*. Waveform *k* is then inverted in inverter 34 and used to gate the clock bits of waveform j through AND gate 35. The separated clock bits are shown in waveform *m*. Waveform *l* is applied to single shot 36 to produce a gating signal shown in waveform *n*. The level of this signal is raised by the leading edge of each data bit and dropped as the signal shot times out after the trailing edge of the succeeding clock bit. Waveform *n* is thus similar to waveform *l*, but with expanded pulse widths. Waveform *n* is then used to gate selected pulses of waveform *m* through AND gate 37. The result is waveform *o* which corresponds to waveform *l* with each data bit displaced to bring it into synchronism with the succeeding clock bit. The synchronized data signals of waveform *o* are applied to single shot 38. The output of single shot 38 is shown in waveform *p* in which the level of the output signal is raised by the signals of waveform *o* and dropped when the single shot times out approximately one clock interval later. Waveform *p* is applied to the data gate to vary the time constant between a low value of 3/5 the clock interval to a high value of 3/4 the clock interval. In this example, wherein the clock interval is 800 nanoseconds, the low time constant is 480 nanoseconds and the high time constant is 600 nanoseconds. As can be seen from waveform *p*, the data gate is normally set at the high time constant of 600 nanoseconds. The time constant is adjusted to its low value by each synchronized data signal of waveform *o*. The result is that the data gate is set at its low time constant during each clock interval which follows a clock interval in which a data bit occurs, and is reset to its high time constant during each clock interval following a clock interval having no data bit. The circuitry of FIG. 4, like that of FIG. 1, thus accommodates the maximum bit shift between adjacent clock bits, which occurs when the first clock bit is preceded by a data bit and the second clock bit is followed by a data bit ($C_2$ and $C_3$), by selection of the low time constant for this condition. The maximum bit shift between adjacent clock and data bits, which occurs when no data bit precedes the clock bit ($C_3$ and $D_3$), is accommodated by selection of the high time constant.

The present invention provides a self-synchronizing clock and data detector which accommodates maximum bit shift and which does not require any format signals to be written ahead of the recorded data. The disclosed circuitry requires only one clock interval of a first binary value at the beginning of each record for the clock detector to synchronize on the clock bits in the record.

From an analysis of the waveforms produced when double frequency recorded signals are read from a memory, it becomes apparent that the clock bits are subject to the greatest amount of bit shift and particularly those clock bits which occur between a data bit and a clock bit, or vice versa. It further becomes clear that there are three possible conditions for each clock bit, i.e., the clock bit can be shifted away from the preceding data bit; it can remain in its proper position; or it can be shifted toward the preceding clock bit. However, by examination of any given clock interval, the number of possibilities for the next succeeding clock interval can be reduced by one, so that the direction of the bit shift in the next clock interval is predictable. When a data bit occurs in a given clock interval, the following clock bit will either remain in position or it will be shifted away from the preceding data bit. Likewise, when no data bit occurs in the given clock interval, the following clock bit will either remain in position or it will be shifted toward the preceding clock bit. Thus, at the time that a data bit is detected or not detected in a given clock interval, the direction of bit shift in the next succeeding clock interval can be predicted and provision can be made to accommodate it. Since the direction of the bit shift is thus accurately predictable, the detection circuitry can be made adjustable between two positions to accommodate the maximum amount of bit shif in either direction.

The invention has been particularly shown and described with reference to a preferred embodiment, however, modifications and variations of the invention are possible in light of the above teachings. It is therefore understood that within the scope of the appended claims, the invention may be practiced otherwise than as specifically described.

What we claim is:

1. Detection circuitry for double frequency recorded binary signals which include a clock bit at the beginning of each clock interval and a data bit substantially at the midpoint of each clock interval, wherein such clock bits and data bits are subject to phase shift, including:

a read line carrying double frequency recorded signals as read from a magnetic medium;

first circuit means coupled to the read line for detecting the absence or presence of a data bit during each clock interval, said first circuit means having a variable time constant; and second circuit means coupled to the first circuit means for varying the time constant of said first circuit means to compensate for any bit shift during the next clock interval.

2. Detection circuitry as defined in claim 1 wherein: the first circuit means has a variable time constant with at least two values, a first value equal to approximately ⅗ of the nominal clock interval and a second value equal to approximately ¾ of the nominal clock interval; and the second circuit means includes a feedback timing circuit responsive to the detected clock intervals for adjusting the time constant of the first circuit means between the first and second values.

3. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

a first detector circuit having a variable time constant, said circuit being connected to the read line for detecting clock intervals of a selected binary value and providing a data output signal;

a second detector circuit connected to the read line for detecting the first bit in each clock interval and providing a clock output signal;

means for synchronizing the outputs of the detector circuits, and means connected to the first detector circuit for adjusting the time constant thereof as a function of the data output signals.

4. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

a first detector circuit having a variable time constant, said circuit being connected to the read line for detecting clock intervals of a selected binary value and providing a data output signal;

a second detector circuit connected to the read line for detecting the first bit in each clock interval and providing a clock output signal;

means for synchronizing the outputs of the detector circuits, and means connected to the first detector circuit for adjusting the time constant thereof from its normal setting for approximately one clock interval each time a clock interval of the selected binary value is detected by the first detector circuit.

5. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

a first detector circuit having a variable time constant, said circuit being connected to the read line for detecting clock intervals of a selected binary value and providing a data output signal;

a second detector circuit connected to the read line for detecting the first bit in each clock interval and providing a clock output signal;

means for synchronizing the outputs of the detector circuits; and a feedback timing circuit connected to the first detector circuit for adjusting the time constant thereof for a predetermined period in accordance with the data output signal.

6. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

a first detector circuit having a variable time constant, said circuit being connected to the read line for detecting clock intervals of a first binary value;

A second detector circuit connected to the read line for detecting the first bit in each clock interval; and a connection between the first and second detector circuits for momentarily increasing the time constant of the first detector circuit each time a clock bit is detected by the second detector circuit.

7. Detection circuitry as defined in claim 6 which includes:

a timing circuit connected to the first detector circuit for increasing the time constant thereof for approximately one clock interval each time a clock interval of the first binary value is detected.

8. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

a first detector circuit having a variable time constant, said circuit being connected to the read line for detecting the clock intervals of a first binary value and providing a data signal output;

a second detector circuit connected to the read line for detecting the clock bit in each clock interval and providing a clock signal output;

means for synchronizing the outputs of the second detector circuit and the first detector circuit;

a timing circuit connected to the first detector circuit for increasing the time constant thereof to an intermediate value for approximately one clock interval each time a clock interval of the first binary value is detected; and means for momentarily increasing the time constant of the first detector circuit to a high value each time a clock bit is detected by the second detector circuit.

9. Detection circuitry for double frequency recorded binary signals which include a clock bit at the beginning of each clock interval and a data bit at the midpoint of each clock interval of a second binary value, including:

a read line carrying double frequency recorded signals as read from a magnetic medium;

a detector circuit having a variable time constant, said circuit being connected to the read line for detecting clock intervals of a selected binary value; and means connected to the detector circuit for adjusting the time constant of the circuit to accommodate bit shift in the recorded signals.

10. Detection circuitry as defined in claim 9 in which the means includes a feedback timing circuit responsive to the detected clock intervals for adjusting the time constant of the detector circuit.

11. Detection circuitry as defined in claim 7 wherein:

the detector circuit has a variable time constant with at least two values, a first value equal to approximately ⅗ of the nominal clock interval and a second value equal to approximately ¾ of the nominal clock interval; and the means includes a feedback timing circuit responsive to the detected clock intervals for adjusting the time constant of the detector circuit between the first and second values.

12. Detection circuitry as defined in claim 11 including: a second detector circuit connected to the read line for detecting the clock bit in each clock interval; and means for adjusting the time constant to a third value higher than the second value in response to each detected clock bit.

References Cited

UNITED STATES PATENTS

| | | | |
|---|---|---|---|
| 2,462,100 | 2/1949 | Hollabaugh | 328—110 |
| 2,830,179 | 4/1958 | Stenning | 328—110 XR |
| 2,972,735 | 2/1961 | Fuller et al. | 340—174.1 |
| 3,069,568 | 12/1962 | Day | 307—88.5 |
| 3,108,265 | 11/1963 | Moe | 340—345 |
| 3,191,013 | 6/1965 | Reader | 328—109 XR |
| 3,217,329 | 11/1965 | Gabor | 340—174.1 |
| 3,244,986 | 4/1966 | Rumble | 328—109 XR |
| 3,337,747 | 8/1967 | Krasnick et al. | 328—63 XR |

ARTHUR GAUSS, *Primary Examiner.*

H. DIXON, *Assistant Examiner.*

UNITED STATES PATENT OFFICE

CERTIFICATE OF CORRECTION

Patent No. 3,390,284 June 25, 1968

James D. Carothers et al.

It is certified that error appears in the above identified patent and that said Letters Patent are hereby corrected as shown below:

Column 8, line 67, the claim reference numeral "7" should read -- 9 --.

Signed and sealed this 26th day of August 1969.

(SEAL)
Attest:

Edward M. Fletcher, Jr.
Attesting Officer

WILLIAM E. SCHUYLER, JR.
Commissioner of Patents